(12) United States Patent
Xue et al.

(10) Patent No.: US 6,756,437 B1
(45) Date of Patent: Jun. 29, 2004

(54) METHOD FOR PRODUCING AN AQUEOUS DISPERSION OF PARTICLES MADE UP OF POLYMERISATE AND FINE INORGANIC SOLID MATERIAL

(75) Inventors: Zhijian Xue, Ludwigshafen (DE); Harm Wiese, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 3 days.

(21) Appl. No.: 10/069,960

(22) PCT Filed: Aug. 31, 2000

(86) PCT No.: PCT/EP00/08510

§ 371 (c)(1),
(2), (4) Date: Mar. 8, 2002

(87) PCT Pub. No.: WO01/18081

PCT Pub. Date: Mar. 15, 2001

(30) Foreign Application Priority Data

Sep. 8, 1999 (DE) .......................................... 199 42 777
Dec. 22, 1999 (DE) .......................................... 199 61 964

(51) Int. Cl.$^7$ ............................ C08F 292/00; C08F 2/44
(52) U.S. Cl. ........................ 524/401; 524/493; 524/497
(58) Field of Search ................................. 524/401, 493, 524/497

(56) References Cited

U.S. PATENT DOCUMENTS

| | | | |
|---|---|---|---|
| 3,544,500 A | | 12/1970 | Osmond et al. |
| 4,421,660 A | * | 12/1983 | Solc nee Hajna ......... 252/62.54 |
| 4,608,401 A | * | 8/1986 | Martin ........................ 523/205 |
| 4,609,608 A | * | 9/1986 | Solc .......................... 430/106.3 |
| 4,981,882 A | | 1/1991 | Smith et al. |
| 5,104,764 A | * | 4/1992 | Wada et al. ........... 430/137.17 |
| 5,431,956 A | | 7/1995 | Robb et al. |
| 5,750,618 A | * | 5/1998 | Vogt et al. .................. 524/836 |
| 6,455,219 B1 | | 9/2002 | Chen et al. |

FOREIGN PATENT DOCUMENTS

| | | | | |
|---|---|---|---|---|
| EP | 0 104 498 | 1/1983 | | |
| EP | 0 505 230 | 3/1992 | | |
| EP | 0 572 128 | 12/1993 | | |
| EP | 0 606 930 | 7/1994 | | |
| GB | 2 227 739 | 1/1990 | | |
| GB | 2 250 020 | 5/1992 | | |
| GB | 2250020 A | * | 5/1992 | ............. C09C/3/10 |
| JP | 11-209622 | 1/1998 | | |

OTHER PUBLICATIONS

Urs Hafeli et al., eds.: "Scientific and Clinical Applications of Magnetic Carriers" Journal of Colloid and Interface Science, 109, pp. 69–76, 1986.
Wolf–Dieter Hergeth et al.: "Polymerization in the presence of seeds. Part IV: Emulsion polymers containing inorganic filler particles" Polymer, 30, pp. 254–258 1989.
Yutaka Haga et al.: "Encapsulating polymerization of titanium dioxide" Angew. Makromol. Chemie, 189, pp. 23–34 1991.
Fu Long et al.: "Study on encapsulation of organic polymers in the presence of inorganic sol particles" Tianjin Daxue Xuebao, 4, pp. 10–15 1991.
E. Bourgeat–Lami et al.: "Emulsion polymerization in the presence of colloidal silica particles" Angew. Makromol. Chemie, 242, pp. 105–122 1996.
Bernd–R. Paulke et al.: "Synthesis studies on paramagnetic polystyrene latex particles" pp. 69–79 1997.
Christelle Barthet et al.: "Synthesis of novel polymer–silica colloidal nanocomposites via free–radical polymerization of vinyl monomers" Advance materials, vol. 11, No. 5, pp. 408–410 1999.

* cited by examiner

Primary Examiner—Kelechi C. Egwim
(74) Attorney, Agent, or Firm—Oblon, Spivak, McClelland, Maier & Neustadt, P.C.

(57) ABSTRACT

A process for preparing an aqueous dispersion of composite particles composed of addition polymer and finely divided inorganic solid, in which process at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant.

10 Claims, No Drawings

METHOD FOR PRODUCING AN AQUEOUS DISPERSION OF PARTICLES MADE UP OF POLYMERISATE AND FINE INORGANIC SOLID MATERIAL

The present invention relates to a process for preparing an aqueous dispersion of particles composed of addition polymer and finely divided inorganic solid (composite particles), in which process at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant.

The invention further relates to aqueous dispersions of composite particles and their use, and to composite-particle powders.

Aqueous dispersions of composite particles are general knowledge. They are fluid systems whose disperse phase in the aqueous dispersion medium comprises polymer coils consisting of a plurality of intertwined polymer chains—known as the polymer matrix—and particles composed of finely divided inorganic solid, which are in disperse distribution. The diameter of the composite particles is frequently within the range from 50 to 5,000 nm.

Like polymer solutions when the solvent has evaporated and aqueous polymer dispersions when the aqueous dispersion medium has evaporated, aqueous dispersions of composite particles have the potential to form modified polymer films containing finely divided inorganic solid, and on account of this potential they are of particular interest as modified binders—for example, for paints or for compositions for coating leather, paper or plastics films. The composite-particle powders obtainable in principle from aqueous dispersions of composite particles are, furthermore, of interest as additives for plastics, as components for toner formulations, or as additives in electrophotographic applications.

The preparation of aqueous dispersions of composite particles is based on the following prior art.

A process for preparing polymer-enveloped inorganic particles by means of aqueous emulsion polymerization is disclosed in U.S. Pat. No. 3,544,500. In this process the inorganic particles are coated with water-insoluble polymers before the actual aqueous emulsion polymerization. The inorganic particles thus treated in a laborious process are dispersed in an aqueous medium using special stabilizers.

EP-A 104 498 relates to a process for preparing polymer-enveloped solids. A characteristic of the process is that finely divided solids having a minimal surface charge are dispersed in the aqueous polymerization medium by means of a nonionic protective colloid and the ethylenically unsaturated monomers added are polymerized by means of nonionic polymerization initiators.

U.S. Pat. No. 4,421,660 discloses a process for preparing aqueous dispersions whose disperse particles feature inorganic particles surrounded completely by a polymer shell. The aqueous dispersions are prepared by free-radically initiated aqueous emulsion polymerization of hydrophobic, ethylenically unsaturated monomers in the presence of inorganic particles in disperse distribution.

A process for polymerizing ethylenically unsaturated monomers in the presence of uncharged inorganic solid particles stabilized in the aqueous reaction medium using nonionic dispersants is disclosed in U.S. Pat. No. 4,608,401.

The free-radically initiated aqueous emulsion polymerization of styrene in the presence of modified silicon dioxide particles is described by Furusawa et al. in Journal of Colloid and Interface Science 109 (1986) 69 to 76. The spherical silicon dioxide particles, having an average diameter of 190 nm, are modified using hydroxypropylcellulose.

Hergeth et al. (see Polymer 30 (1989) 254 to 258) describe the free-radically initiated aqueous emulsion polymerization of methyl methacrylate and, respectively, vinyl acetate in the presence of aggregated, finely divided quartz powdery The particle sizes of the aggregated quartz powder used are between 1 and 35 µm.

GB-A 2 227 739 relates to a special emulsion polymerization process in which ethylenically unsaturated monomers are polymerized using ultrasound waves in the presence of dispersed inorganic powders which have cationic charges. The cationic charges of the dispersed solid particles are generated by treating the particles with cationic agents, preference being give to aluminum salts. The document, however, gives no details of particle sizes and stability of the aqueous dispersions of solids.

EP-A 505 230 discloses the free-radical aqueous emulsion polymerization of ethylenically unsaturated monomers in the presence of surface-modified silicon dioxide particles. They are functionalized using special acrylic esters containing silanol groups.

U.S. Pat. No. 4,981,882 relates to the preparation of composite particles by means of a special emulsion polymerization process. Essential features of the process are finely divided inorganic particles dispersed in the aqueous medium by means of basic dispersants; the treatment of these inorganic particles with ethylenically unsaturated carboxylic acids; and the addition of at least one amphiphilic component for the purpose of stabilizing the dispersion of solids during the emulsion polymerization. The finely divided inorganic particles preferably have a size of between 100 and 700 nm.

Haga et al. (cf. Angewandte Makromolekulare Chemie 189 (1991) 23 to 34) describe the influence of the nature and concentration of the monomers, the nature and concentration of the polymerization initiator, and the pH on the formation of polymers on particles of titanium dioxide dispersed in an aqueous medium. High encapsulation yields of the titanium dioxide particles are obtained if the polymer chains and the titanium dioxide particles have opposing charges (cf. the abovementioned publication, sections 3.1, Polymerization behavior on encapsulation, and 4, Conclusion). However, the publication contains no information on the particle size and the stability of the titanium dioxide dispersions.

In Tianjin Daxue Xuebao 4 (1991) pages 10 to 15, Long et al. describe the dispersant-free polymerization of methyl methacrylate in the presence of finely divided particles of silicon dioxide and, respectively, aluminum. High encapsulation yields of the inorganic particles are obtained if the end groups of the polymer chains and the inorganic particles have opposing charges.

EP-A 572 128 relates to a preparation process for composite particles in which the inorganic particles are treated with an organic polyacid or a salt thereof at a defined pH in an aqueous medium, and the subsequent free-radically initiated aqueous emulsion polymerization of ethylenically unsaturated monomers takes place at a pH<9.

Bourgeat-Lami et al. (cf. Angewandte Makromolekulare Chemie 242 (1996) 105 to 122) describe the reaction products obtainable by free-radical aqueous emulsion polymerization of ethyl acrylate in the presence of functionalized and unfunctionalized silicon dioxide particles. The polymerization experiments were generally carried out using anionically charged silicon dioxide particles, the nonionic nonylphenol ethoxylate NP30 and the anionic sodium dodecyl sulfate (SDS) as emulsifiers and potassium peroxodisulfate as free-radical polymerization initiator. The authors describe the resulting reaction products as aggregates containing more than one silicon dioxide particle or as polymer clusters which form on the silicon dioxide surface.

Paulke et al. (cf. Synthesis Studies of Paramagnetic Polystyrene Latex Particles in Scientific and Clinical Applications of Magnetic Carriers, pages 69 to 76, Plenum Press, New York, 1997) describe three fundamental synthesis routes for preparing aqueous polymer dispersions containing iron oxide. Because of the deficient stability of the aqueous dispersion of solids, the use of freshly precipitated iron(II/III) oxide hydrate is an unavoidable precondition for all of the synthesis routes. In the first synthesis route, in the presence of this freshly precipitated iron(II/III) oxide hydrate, the free-radically initiated aqueous emulsion polymerization of styrene takes place with SDS as emulsifier and potassium peroxodisulfate as polymerization initiator. In the authors' favored second synthesis route, styrene and methacrylic acid are polymerized in the presence of the freshly precipitated iron(II/III) oxide hydrate, the emulsifier N-cetyl-N-trimethylammonium bromide (CTAB), and special surface-active polymerization initiators (PEGA 600) in methanolic/aqueous medium. The third synthesis route uses ethanol and methoxyethanol as polymerization medium, hydroxypropylcellulose as emulsifier, benzoyl peroxide as polymerization initiator, and a special iron(II/III) oxide/styrene mixture in order to prepare polymer dispersions containing iron oxide.

The Japanese laid-open patent JP 11-209 622 discloses a process for preparing core/shell particles which comprise a silicon dioxide particle core and a polymer shell. The core/shell particles are prepared by pretreating silicon dioxide particles, present in colloidal form in the aqueous medium, with a cationic vinyl monomer, or a cationic free-radical initiator, and subsequently effecting a free-radically initiated aqueous emulsion polymerization with ethylenically unsaturated monomers. Armes et al. (cf. Advanced Materials 11 (5) (1999) 408 to 410) describe the preparation of silicon dioxide composite particles which are obtainable in an emulsifier-free, free-radically initiated aqueous emulsion polymerization with special olefinically unsaturated monomers in the presence of dispersed silicon dioxide particles. Postulated as a precondition for the formation of polymer particles containing silicon dioxide is a strong acid/base interaction between the polymer formed and the acidic silicon dioxide particles used. Polymer particles containing silicon dioxide were obtained with poly-4-vinyl-pyridine and copolymers of styrene and, respectively, methyl methacrylate with 4-vinyl-pyridine.

It is an object of the present invention to provide another process for preparing an aqueous dispersion of composite particles by the method of free-radically initiated aqueous emulsion polymerization which is unhampered or less hampered by the disadvantages of the known processes.

We have found that this object is achieved by a process for preparing an aqueous dispersion of composite particles composed of addition polymer and finely divided inorganic solid, in which process at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant, wherein a) a stable aqueous dispersion of said at least one inorganic solid is used, said dispersion having the characteristic features that at an initial solids concentration of $\geq 1\%$ by weight, based on the aqueous dispersion of said at least one solid, it still contains in dispersed form one hour after its preparation more than 90% by weight of the originally dispersed solid and its dispersed solid particles have a weight-average diameter $\leq 100$ nm, b) the dispersed particles of said at least one inorganic solid exhibit a nonzero electrophoretic mobility in an aqueous standard potassium chloride solution at a pH which corresponds to the pH of the aqueous reaction medium at the beginning of the emulsion polymerization, and c) the radical-generating component of said at least one free-radical polymerization initiator and/or the dispersive component of said at least one dispersant have at least one electrical charge whose sign is opposite to the sign of the electrophoretic mobility of the dispersed particles of said at least one solid as possessed by said particles in an aqueous standard potassium chloride solution at a pH which corresponds to the pH of the aqueous reaction medium at the beginning of the emulsion polymerization.

Finely divided inorganic solids suitable for the process of the invention are all those which form stable aqueous dispersions which at an initial solids concentration of $\geq 1\%$ by weight, based on the aqueous dispersion of said at least one solid, still contain in dispersed form one hour after their preparation more than 90% by weight of the originally dispersed solid and whose dispersed solid particles have a weight-average diameter $\geq 100$ nm and which, furthermore, exhibit a nonzero electrophoretic mobility at a pH which corresponds to the pH of the aqueous reaction medium at the beginning of the emulsion polymerization.

Suitable finely divided inorganic solids which can be used in accordance with the invention include metals, metal compounds, such as metal oxides and metal salts, and also semimetal compounds and nonmetal compounds. Finely divided metal powders which can be used are noble metal colloids, such as palladium, silver, ruthenium, platinum, gold and rhodium, for example, and their alloys. Examples that may be mentioned of finely divided metal oxides include titanium dioxide (commercially available, for example, as Hombitec® grades from Sachtleben Chemie GmbH), zirconium(IV) oxide, tin(II) oxide, tin(IV) oxide (commercially available, for example, as Nyacol® SN grades from Akzo-Nobel), aluminum oxide (commercially available, for example, as Nyacol® AL grades from Akzo-Nobel), barium oxide, magnesium oxide, various iron oxides, such as iron(II) oxide (wustite), iron(III) oxide (hematite) and iron(II/III) oxide (magnetite), chromium(III) oxide, antimony(III) oxide, bismuth(III) oxide, zinc oxide (commercially available, for example, as Sachtotec® grades from Sachtleben Chemie GmbH), nickel(II) oxide, nickel (III) oxide, cobalt(II) oxide, cobalt(III) oxide, copper(II) oxide, yttrium(III) oxide (commercially available, for example, as Nyacol® YTTRIA grades from Akzo-Nobel), cerium(IV) oxide (commercially available, for example, as Nyacol® CEO2 grades from Akzo-Nobel), amorphous and/or in their different crystal modifications, and also their hydroxy oxides, such as, for example, hydroxytitanium(IV) oxide, hydroxyzirconium(IV) oxide, hydroxyaluminum oxide (commercially available, for example, as Disperal® grades from Condea-Chemie GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium (III) sulfide, titanium(IV) sulfide, zirconium(IV) sulfide, antimony(III) sulfide, and bismuth(III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin(III) orthophosphate, iron(II) orthophosphate, and iron(III) orthophosphate, metaphosphates, such as lithium metaphosphate, calcium metaphosphate, and aluminum metaphosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxyapatite [$Ca_5\{(PO_4)_3OH\}$], orthosilicates, such as lithium orthosilicate, calcium/magnesium orthosilicate, aluminum orthosilicate, iron orthosilicates, magnesium orthosilicate, zinc orthosilicate, and zirconium orthosilicates, metasilicates, such as lithium metasilicate, calcium/magnesium metasilicate, calcium metasilicate, magnesium metasilicate, and zinc metasilicate, sheet silicates, such as sodium aluminum silicate and sodium magnesium silicate, especially in spontaneously delaminating form, such as, for example, Optigel® SH (trademark of Sudchemie AG), Saponit® SKS-20 and Hektorits® SKS 21 (trademarks of Hoechst AG), and Laponite® RD and Laponite® GS (trademarks of Laporte Industries Ltd.), aluminates, such as lithium aluminate, calcium aluminate, and zinc aluminate, borates, such as magnesium metaborate and magnesium orthoborate, oxalates, such as calcium oxalate, zirconium(IV) oxalate, magnesium oxalate, zinc oxalate, and aluminum oxalate, tartrates, such as calcium tartrate, acetylacetonates, such as aluminum acetylacetonate and iron(III) acetylacetonate, salicylates, such as aluminum salicylate, citrates, such as calcium citrate, iron (II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(II) oleate, and zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as Aerosil® (trademark of Degussa AG), Levasil® (trademark of Bayer AG), Ludox® (trademark of DuPont), Nyacol® and Bindzil® (trademarks of Akzo-Nobel) and Snowtex® (trademark of Nissan Chemical Industries, Ltd.). Nonmetal compounds suitable in accordance with the invention are, for example, colloidal graphite and diamond.

As said at least one finely divided inorganic solid it is furthermore possible to use all compounds mentioned above whose surfaces have been modified with polymeric compounds or inorganic materials.

Particularly suitable finely divided inorganic solids are those whose solubility in water at 20° C. and 1 bar (absolute) is $\leq 1$ g/l, preferably $\leq 0.1$ g/l and, in particular, $\leq 5$ 0.01 g/l. Particular preference is given to compounds selected from the group consisting of silicon dioxide, aluminum oxide, tin(IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, iron(II) oxide, iron(III) oxide, iron(II/III) oxide, titanium dioxide, hydroxyapatite, zinc oxide, and zinc sulfide.

In the process of the invention it is also possible to use with advantage the commercially available compounds of the Aerosil®, Levasil®, Ludox®, Nyacol® and Bindzil® grades (silicon dioxide), Disperal® registered grades (hydroxyaluminum oxide), Nyacol® AL grades (aluminum oxide), Hombitec® grades (titanium dioxide), Nyacol® SN grades (tin(IV) oxide), Nyacol® YTTRIA grades (yttrium (III) oxide), Nyacol® CE02 grades (cerium(IV) oxide) and Sachtotec® grades (zinc oxide).

The finely divided inorganic solids which can be used in the process of the invention have particles which, dispersed in the aqueous reaction medium, have a weight-average particle diameter of $\leq 100$ nm. Finely divided inorganic solids used successfully are those whose dispersed particles have a weight-average diameter >0 nm but $\leq 90$ nm, $\leq 80$ nm, $\leq 70$ nm, $\leq 60$ nm, $\leq 50$ nm, 40 nm, $\leq 30$ nm, $\leq 20$ nm or $\leq 10$ nm and all values in between. The weight-average particle diameters can be determined, for example, by the method of analytical ultracentrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Machtle, pages 147 to 175).

The obtainability of finely divided solids is known in principle to the skilled worker and they are obtained, for example, by precipitation reactions or chemical reactions in the gas phase (cf. E. Matijevic, Chem. Mater. 5 (1993) 412 to 426; Ullmann's Encyclopedia of Industrial Chemistry, Vol. A 23, pages 583 to 660, Verlag Chemie, Weinheim, 1992; D. F. Evans, H. Wennerstrbm in The Colloidal Domain, pages 363 to 405, Verlag Chemie, Weinheim, 1994, and R. J. Hunter in Foundations of Colloid Science, Vol. I, pages 10 to 17, Clarendon Press, Oxford, 1991).

The stable dispersion of solids is prepared by dispersing the finely divided inorganic solid into the aqueous medium. Depending on the way in which the solids are prepared, this is done either directly, in the case, for example, of precipitated or pyrogenic silicon dioxide, aluminum oxide, etc., or by adding appropriate auxiliaries, such as dispersants, for example.

For the purposes of the process of the invention, dispersants used are generally those which maintain not only the finely divided inorganic solid particles but also the monomer droplets and the resulting composite particles in disperse distribution in the aqueous phase and so ensure the stability of the aqueous dispersion of composite particles that is produced. Suitable dispersants include both the protective colloids commonly used to carry out free-radical aqueous emulsion polymerizations, and emulsifiers.

Examples of suitable protective colloids are polyvinyl alcohols, polyalkylene glycols, alkali metal salts of polyacrylic acids and polymethacrylic acids, cellulose derivatives, starch derivatives and gelatin derivatives, or copolymers containing acrylic acid, methacrylic acid, maleic anhydride, 2-acrylamido-2-methylpropane-sulfonic acid and/or styrenesulfonic acid, and the alkali metal salts of these copolymers, and also homopolymers and copolymers containing N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides, and also the N-protonated and/or N-alkylated derivatives of these polymers. Examples thereof are N-dimethylaminoethyl acrylate, N-diethylaminoethyl acrylate, N-dimethylaminoethyl methacrylate, N-(3-dimethylaminopropyl)methacrylamide, tert-butylaminoethyl methacrylate, 2-N-benzyldimethylammonium ethyl methacrylic ester chloride, 2-N-trimethylammonium ethyl methacrylic ester chloride, 2-N-benzyldimethylammonium ethyl acrylic ester chloride, and 1-hydroxyethylimidazolin-2-one methacrylate. An exhaustive description of further suitable protective colloids is given in Houben-Weyl, Methoden der organischen Chemie, Volume XIV/1, Makromolekulare Stoffe [Macromolecular substances], Georg-Thieme-Verlag, Stuttgart, 1961, pages 411 to 420. Particularly suitable in accordance with the invention are anionic protective colloids, i.e., protective colloids whose dispersive component has at least one negative electrical charge, such as alkali metal salts of polyacrylic acids and polymethacrylic acids, copolymers containing acrylic acid, methacrylic acid, 2-acrylamido-2-methylpropanesulfonic acid, styrenesulfonic acid and/or maleic anhydride, and the alkali metal salts of such copolymers, and also alkali metal salts of sulfonic acids of high molecular mass compounds such as, for example, polystyrene, and also cationic protective colloids, i.e., protective colloids whose dispersive component has at least one positive electrical charge, such as, for example, the N-protonated and/or N-alkylated derivatives of homopolymers and copolymers containing N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, aminofunctional acrylates, methacrylates, acrylamides and/or methacrylamides.

It is of course also possible to use mixtures of emulsifiers and/or protective colloids. As dispersants it is common to use exclusively emulsifiers, whose relative molecular weights, unlike those of the protective colloids, are usually below 1,500. They can be anionic, cationic or nonionic in nature. Where mixtures of surface-active substances are used the individual components must of course be compatible with one another, which in case of doubt can be checked by means of a few preliminary experiments. In general, anionic emulsifiers are compatible with one another and with nonionic emulsifiers. The same applies to cationic emulsifiers as well, whereas anionic and cationic emulsifiers are usually incompatible with one another. An overview of suitable emulsifiers is given in Houben-Weyl, Methoden der organischen Chemie, Volume XIV/1, Makromolekulare Stoffe [Macromolecular substances], Georg-Thieme-Verlag, Stuttgart, 1961, pages 192 to 208.

Examples of customary nonionic emulsifiers are ethoxylated mono-, di- and tri-alkylphenols (EO units: 3 to 50, alkyl: $C_4$ to $C_{12}$) and ethoxylated fatty alcohols (EO units: 3 to 50; alkyl: $C_8$ to $C_{36}$).

Customary anionic emulsifiers, i.e., emulsifiers whose dispersive component has at least one negative electrical charge, are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further surface-active substances whose dispersive component has at least one negative electrical charge are, furthermore, compounds of the formula I

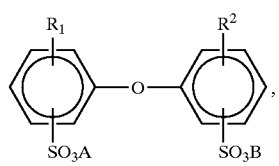

(I)

in which $R^1$ and $R^2$ are hydrogens or $C_4$ to $C_{24}$ alkyl but are not both simultaneously hydrogens and A and B can be alkali metal ions and/or ammonium ions. In the formula I, $R^1$ and $R^2$ are preferably linear or branched alkyl radicals of 6 to 18 carbons, especially 6, 12 and 16 carbons, or —H, $R^1$ and $R^2$ not both being hydrogens simultaneously. A and B are preferably sodium, potassium or ammonium, particular preference being given to sodium. Particularly advantageous compounds I are those in which A and B are sodium, $R^1$ is a branched alkyl radical of 12 carbons, and $R^2$ is a hydrogen or $R^1$. Frequently, use is made of technical-grade mixtures containing a fraction of from 50 to 90% by weight of the monoalkylated product; for example, Dowfax® 2A1 (trademark of Dow Chemical Company). The compounds I are widely known, from U.S. Pat. No. 4,269,749, for example, and are obtainable commercially.

Suitable cationic emulsifiers, i.e. emulsifiers whose dispersive component has at least one positive electrical charge, are generally $C_6$-$C_{18}$-alkyl, aralkyl or heterocyclyl-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Furthermore, polyglycol ether derivatives may also carry at least one positive electrical charge in acidic medium, owing to the formation of an oxonium structure. Examples that may be mentioned include dodecylammonium acetate or the corresponding hydrochloride, the various paraffinic acid trimethylammonium ethyl esters, N-cetylpyridinium chloride, N-laurylpyridinium sulfate, and also N-cetyltrimethylammonium bromide, N-dodecyltrimethylammonium bromide, N-octyltrimethylammonium bromide, N-distearyldimethylammonium chloride, and the gemini surfactant N,N'-(lauryldimethyl)ethylenediamine dibromide. Many further examples can be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989.

In general the amount of dispersant used is from 0.05 to 20% by weight, frequently from 0.1 to 5% by weight, often from 0.2 to 3% by weight, based in each case on the overall weight of said at least one finely divided inorganic solid and on said at least one monomer used for the polymerization. Some or all of the at least one dispersant used in the process can be introduced as an initial charge in the aqueous dispersion of solids, and the remainder (if any) can be added continuously or discontinuously in the course of the free-radically initiated aqueous emulsion polymerization. An alternative option is to include, if desired, only part of the at least one dispersant in the initial charge in the aqueous dispersion of solids and to add the total amount, or the remaining amount if appropriate, of said at least one dispersant continuously or discontinuously during the free-radical emulsion polymerization.

The abovementioned dispersants are suitable quite generally, of course, for conducting the process of the invention. However, the process of the invention also embraces the preparation of aqueous dispersions of composite particles containing polymers which are self-emulsifying, where monomers having ionic groups bring about stabilization as a result of the repulsion of like charges. In such cases, there is generally no need to use an additional dispersant. Furthermore, because of their uniform charge, the inorganic solid particles may also have a stabilizing effect on the aqueous dispersion of composite particles.

In accordance with the invention, however, suitable solids are only those whose aqueous dispersion, at an initial solids concentration of ≧1% by weight, based on the aqueous dispersion of the solid, still contains in dispersed form one hour after its preparation more than 90% by weight of the originally dispersed solid and whose dispersed solid particles have a weight-average diameter ≦100 mm. Initial solids concentrations ≦60% by weight are customary. With advantage, however, it is also possible to use initial solids concentrations ≦55% by weight, ≦50% by weight, ≦45% by weight, ≦40% by weight, ≦35% by weight, ≦30% by weight, ≦25% by weight, ≦20% by weight, ≦15% by weight, ≦10% by weight and ≧1% by weight, ≧3% by weight or ≧5% by weight, based in each case on the aqueous dispersion of the solid, and all values in between.

An essential feature of the invention is that the dispersed solid particles exhibit a nonzero electrophoretic mobility in an aqueous standard potassium chloride solution at a pH which corresponds to the pH of the aqueous reaction medium at the beginning of the emulsion polymerization. For the purposes of this document, aqueous reaction medium at the beginning of the emulsion polymerization is the aqueous reaction medium present directly prior to adding said at least one free-radical polymerization initiator. The pH is measured at 20° C. and 1 bar (absolute) using customary commercial pH meters. Depending on the process being carried out, therefore, the pH is measured on an aqueous dispersion containing only the at least one inorganic solid or, in addition, the at least one dispersant and/or, in addition, the monomers used for the emulsion polymerization, and also any further auxiliaries.

The method of determining the electrophoretic mobility is known to the skilled worker (cf., e.g. R. J. Hunter, Introduction to Modern Colloid Science, Section 8.4, pages 241 to 248, Oxford University Press, Oxford, 1993, and K. Oka and K. Furusawa in Electrical Phenomena at Interfaces, Surfactant Science Series, Vol. 76, Chapter 8, pages 151 to 232, Marcel Dekker, New York, 1998). The electrophoretic mobility of the solid particles dispersed in the aqueous reaction medium is measured using a commercial electrophoresis instrument, an example being the Zetasizer 3000 from Malvern Instruments Ltd., at 20° C. and 1 bar (absolute). For this purpose the aqueous dispersion of solid particles is diluted with a pH-neutral 10 millimolar (mM) potassium chloride solution (standard potassium chloride solution) until the concentration of solid particles is from about 50 to 100 mg/l. The adjustment of the sample to the pH possessed by the aqueous reaction medium at the beginning of the emulsion polymerization is carried out using the customary inorganic acids, such as dilute hydrochloric acid or nitric acid, for example, or bases, such as dilute sodium hydroxide solution or potassium hydroxide solution, for example. The migration of the dispersed solid particles in the electrical field is detected by means of what is known as electrophoretic light scattering (cf., e.g., B. R. Ware and W. H. Flygare, Chem. Phys. Lett. 12 (1971) 81 to 85). In this method the sign of electrophoretic mobility is defined by the migrational direction of the dispersed solid particles; in other words, if the dispersed solid particles migrate to the cathode, their electrophoretic mobility is positive, while if they migrate to the anode, it is negative.

If surface-modified solid particles as described, for example, in the prior art are used, then the electrophoretic mobility is measured using these surface-modified particles. If, on the other hand, a finely divided inorganic solid can be dispersed only with the aid of dispersants, then the electrophoretic mobility must be measured using suitable nonionic dispersants, irrespective of whether cationic or anionic dispersants are actually used in the process of the invention. This is necessary because the ionic dispersants adsorb on the dispersed solid particles and so can alter or reverse their electrophoretic mobility.

A suitable parameter for influencing or adjusting the electrophoretic mobility of dispersed solid particles to a certain extent is the pH of the aqueous reaction medium. Protonation and, respectively, deprotonation of the dispersed solid particles alter the electrophoretic mobility positively in the acidic pH range (pH <7) and negatively in the alkaline range (pH >7). A pH range suitable for the process of the invention is that within which a free-radically initiated aqueous emulsion polymerization can be carried out. This pH range is generally from 1 to 12, frequently from 1.5 to 11, and often from 2 to 10.

The conduct of a free-radically initiated aqueous emulsion polymerization of ethylenically unsaturated monomers is described in many instances in the prior art and is therefore sufficiently well known to the skilled worker (cf., e.g., Encyclopedia of Polymer Science and Engineering, Vol. 8, page 659 ff., 1987; D. C. Blackley, in High Polymer Latices, Vol. 1, page 35 ff., 1966; H. Warson, The Applications of Synthetic Resin Emulsions, Chapter 5, page 246 ff., 1972; D. Diederich, Chemie in unserer Zeit 24 (1990) 135 to 142; Emulsion Polymerization, Interscience Publishers, New York, 1965; DE-A 40 03 422, and Dispersionen synthetischer Hochpolymerer, F. Hölscher, Springer-Verlag, Berlin, 1969]. It is usually carried out by dispersely distributing said at least one ethylenically unsaturated monomer in the aqueous medium, often with the use of dispersants, and polymerizing the monomer using at least one free-radical polymerization initiator. The process of the invention differs from this procedure only in the additional presence of at least one finely divided inorganic solid which has a nonzero electrophoretic mobility and in the consequent, special dispersant and/or initiator combination.

Monomers suitable as the monomers having at least one ethylenically unsaturated group for the process of the invention include, in particular, monomers which are easy to polymerize free-radically, such as, for example, ethylene, vinylaromatic monomers, such as styrene, α-methylstyrene, o-chlorostyrene or vinyltoluenes, esters of vinyl alcohol and $C_1$–$C_{18}$ monocarboxylic acids, such as vinyl acetate, vinyl propionate, vinyl n-butyrate, vinyl laurate and vinyl stearate, esters of preferably $C_3$–$C_6$ α,β-monoethylenically unsaturated mono- and dicarboxylic acids, such as especially acrylic acid, methacrylic acid, maleic acid, fumaric acid and itaconic acid, with generally $C_1$–$C_{12}$, preferably $C_1$–$C_8$ and, in particular, $C_{1-C4}$ alkanols, such as, in particular, methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and $C_{4-8}$ conjugated dienes, such as 1,3-butadiene and isoprene. These monomers generally constitute the principal monomers which, based on the overall amount of the monomers to be polymerized by the process of the invention, normally account for a proportion of more than 50% by weight. As a general rule, these monomers are only of moderate to poor solubility in water under standard conditions (20° C., 1 bar (absolute)).

Monomers possessing heightened water-solubility under the abovementioned conditions are, for example, α,β-monoethylenically unsaturated mono- and dicarboxylic acids and their amides, such as acrylic acid, methacrylic acid, maleic acid, fumaric acid, itaconic acid, acrylamide and methacrylamide, for example, and also vinylsulfonic acid, 2-acrylamido-2-methylpropanesulfonic acid, styrenesulfonic acid and the water-soluble salts thereof, and N-vinylpyrrolidone.

Normally, the abovementioned monomers are copolymerized merely as modifying monomers, in amounts, based on the total amount of the monomers to be polymerized, of less than 50% by weight, generally from 0.5 to 20% by weight, preferably from 1 to 10% by weight.

Monomers which customarily increase the internal strength of the films of the polymer matrix normally have at least one epoxy, hydroxyl, N-methylol or carbonyl group or at least two nonconjugated ethylenically unsaturated double bonds. Examples are N-alkylolamides of $C_3$–$C_{10}$ α,β-monoethylenically unsaturated carboxylic acids, among which very particular preference is given to N-methylolacrylamide and N-methylolmethacrylamide, and the esters thereof with $C_1$–$C_4$ alkanols. Also suitable, in addition, are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are the methacrylic and acrylic $C_1$–$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the abovementioned monomers are frequently copolymerized in amounts of from 0.5 to 10% by weight, based on the total amount of the monomers to be polymerized.

In the process of the invention the weight fraction of said at least one ethylenically unsaturated monomer, based on the overall weight of said at least one finely divided inorganic solid and said at least one ethylenically unsaturated monomer used for the polymerization, is generally between 10 and 99% by weight, frequently between 25 and 90% by weight and often between 40 and 80% by weight. In accordance with the invention, some or all of said at least one monomer can be introduced as an initial charge in the reaction medium, together with said at least one finely divided inorganic solid, and the remainder (if appropriate) can be added continuously or discontinuously at the rate at which it is consumed during the free-radical emulsion polymerization. An alternative option is to include only some, if any, of said at least one monomer in the initial charge, in the aqueous dispersion of solids, and then to add continuously or discontinuously the total amount or, if appropriate, the remaining amount during the free-radical emulsion polymerization at the rate at which it is consumed.

Initiators suitable for use as said at least one free-radical polymerization initiator for the free-radical aqueous emulsion polymerization of the invention are all those capable of triggering a free-radical aqueous emulsion polymerization in the presence of said at least one finely divided inorganic solid. The initiators can in principle comprise both peroxides and azo compounds. Redox initiator systems are also suitable, of course. Peroxides used can in principle be inorganic peroxides, such as hydrogen peroxide or peroxodisulfates, such as the mono- or di-alkali metal salts or ammonium salts of peroxodisulfuric acid, examples being the mono- and di-sodium and -potassium salts, or ammonium salts, or else organic peroxides, such as alkyl hydroperoxides, examples being tert-butyl, p-menthyl and cumyl hydroperoxide, and also dialkyl or diaryl peroxides, such as di-tert-butyl peroxide or dicumyl peroxide. Azo compounds used are primarily 2,2'-azobis(isobutyronitrile), 2,2'-azobis-(2,4-dimethylvaleronitrile) and 2,2'-azobis (amidinopropyl) dihydrochloride (AIBA, corresponding to the commercial product V-50 from Wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium salts and/or sodium salts aliphatic sulfinic acids, and alkali metal hydrogen sulfides, e.g., potassium and/or sodium hydrogen sulfide, salts of polyvalent metals, such as iron(II) sulfate, iron(II)/ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general, the amount of the free-radical polymerization initiator used, based on the total amount of the monomers to be polymerized, is from 0.1 to 3% by weight.

As the at least one free-radical polymerization initiator whose radical-generating component carries a t least on e negative ele ctric al charge, mention may be made by way of example of peroxodisulfates, such as the mono- or di-alkali metal salts or ammonium salts of peroxodisulfuric acid, examples being the monosodium, disodium, monopotassium, dipotassium and ammonium salts, and also hydrogen peroxide in an alkaline medium.

A specific example that may be mentioned of said at least one free-radical polymerization initiator whose radical-generating component carries at least one positive electrical charge is AIBA.

In accordance with the invention, some or all of said at least one free-radical polymerization initiator can be introduced, together with said at least one finely divided inorganic solid, as an initial charge in the reaction medium, and any remaining amount can be added continuously or discontinuously at the rate at which it is consumed during the free-radical emulsion polymeriza tion. An alternative option is to include, if appropriate, only s ome of said at least one free-radical polymerization initiator in the initial charge, in the aqueous dispersion of solids, and then to add, continuously or discontinuously, the total amount, or the remainder if appropriate, during the free-radical emulsion polymerization of the invention at the rate at which it is consumed.

Suitable reaction temperatures for the free-radical aqueous emulsion polymerization of the invention in the presence of said at least one finely divided inorganic solid embrace the entire range from 0 to 170° C. In general, the temperatures used are from 50 to 120° C., frequently from 60 to 110° C. and often ≧70 to 100° C. The free-radical aqueous emulsion polymerization of the invention can be conducted at a pressure less than, equal to or greater than 1 bar (absolute), so that the polymerization temperature may exceed 100° C. and can be up to 170° C. Highly volatile monomers such as ethylene, butadiene or vinyl chloride are preferably polymerized under increased pressure. In this case the pressure can adopt values of 1.2, 1.5, 2, 5, 10 or 15 bar or higher. When emulsion polymerizations are conducted under subatmospheric pressure, pressures of 950 mbar, frequently 900 mbar and often 850 mbar (absolute) are established. The free-radical aqueous emulsion polymerization of the invention is advantageously conducted at 1 bar (absolute) under an inert gas atmosphere, such as under nitrogen or argon, for example.

The aqueous reaction medium may in principle also include water-soluble organic solvents, such as methanol, ethanol, isopropanol, butanols, pentanols, etc., for example. Preferably, however, the process of the invention is conducted in the absence of such solvents.

It is an essential feature of the invention that the dispersed particles of said at least one inorganic solid under the conditions described above have a nonzero electrophoretic mobility whose sign is opposite to the at least one electrical charge of the radical-generating component of said at least one free-radical polymerization initiator and/or of the dispersive component of said at least one dispersant. If, therefore, there is at least one finely divided inorganic solid whose dispersed particles have an electrophoretic mobility with a negative sign, the free-radical aqueous emulsion polymerization of the invention takes place with at least one dispersant whose dispersive component carries at least one positive charge and/or with at least one free-radical polymerization initiator whose radical-generating component carries a positive electrical charge. If, on the other hand, there is at least one finely divided inorganic solid in the process of the invention whose dispersed particles have an electrophoretic mobility with a positive sign, then the free-radical aqueous emulsion polymerization of the invention takes place with at least one dispersant whose dispersive component carries at least one negative charge and/or with at least one free-radical polymerization initiator whose radical-generating component carries a negative electrical charge.

The process of the invention can be carried out, for example, by introducing a stable aqueous dispersion of said at least one finely divided inorganic solid, containing either some or all of the required water, of the required at least one dispersant, of the at least one polymerization initiator and/or of the at least one ethylenically unsaturated monomer, and of any further customary auxiliaries and additives, into a reaction vessel, and heating the contents of the reaction vessel to reaction temperature. At this temperature, any remaining amounts of the water, of the at least one dispersant, of the at least one polymerization initiator and/or of the at least one ethylenically unsaturated monomer, and of any further customary auxiliaries and additives, are added continuously or discontinuously with stirring, after which the reaction mixture is held further at reaction temperature if desired.

The process of the invention can alternatively be carried out by introducing a stable aqueous dispersion of said at least one finely divided inorganic solid, containing either some or all of the required water, of the at least one dispersant and/or of any further customary auxiliaries and additives and, if desired, some of said at least one ethylenically unsaturated monomer and of said at least one polymerization initiator into a reaction vessel and heating the contents of the reaction vessel to reaction temperature. At this temperature, all or, if appropriate, the remainder of said at least one ethylenically unsaturated monomer and of said at least one polymerization initiator, and any remaining amounts of the water, of the at least one dispersant and/or of any further customary auxiliaries and additives, is added continuously or discontinuously, with stirring, after which the reaction mixture is held further at reaction temperature if desired.

The composite particles obtainable in accordance with the invention generally possess particle diameters of $\leq 5{,}000$ nm, frequently $\leq 1{,}000$ nm and often $\leq 400$ nm. The particle diameters are determined conventionally by transmission electron microscopy analyses (cf., e.g., L. Reimer, Transmission Electron Microscopy, Springer-Verlag, Berlin, Heidelberg, 1989; D. C. Joy, The Basic Principles of EELS in Principles of Analytical Electron Microscopy, edited by D. C. Joy, A. D. Romig Jr. and J.I. Goldstein, Plenum Press, New York, 1986; L. C. Sawyer and D. T. Grupp, Polymer Microscopy, Chapman and Hall, London, 1987).

The composite particles obtainable by the process of the invention can have different structures. Composite particles having a raspberry-shaped structure are frequently obtained. The composite particles of the invention can comprise one or more of the finely divided solid particles. The finely divided solid particles may be completely enveloped by the polymer matrix. Alternatively, it is possible for some of the finely divided solid particles to be enveloped by the polymer matrix while others are arranged on the surface of the polymer matrix. It is of course also possible for a majority of the finely divided solid particles to be bound on the surface of the polymer matrix. Preferably $\geq 50\%$ by weight or $\geq 60\%$ by weight, frequently $\geq 70\%$ by weight or $\geq 80\%$ by weight, and often $\geq 85\%$ by weight or $\geq 90\%$ by weight of the finely divided solid particles, based in each case on the overall amount of finely divided solid particles present in the composite particles, are bound on the surface of the polymer matrix. It should be noted that in certain cases, depending on the solids concentration of the dispersed composite particles, there may also be partial agglomeration of the composite particles.

The monomer residues remaining in the aqueous dispersion of the composite particles after the end of the main polymerization reaction can of course be removed by steam stripping and/or inert gas stripping and/or by chemical deodorization, as described, for example, in the documents DE-A 4 419 518, EP-A 767 180 and DE-A 3 834 734, without adversely affecting the properties of the aqueous dispersion of composite particles.

Aqueous dispersions of composite particles prepared by the process of the invention described are suitable as raw materials for preparing adhesives, such as pressure-sensitive adhesives, building adhesives or industrial adhesives, for example, binders, such as for paper coating, for example, emulsion paints, or for printing inks and print varnishes for printing plastics films, for producing nonwovens, and for producing protective coats and water vapor barriers, such as in priming, for example. In addition, the dispersions of composite particles obtainable by the process of the invention can be used to modify cement formulations and mortar formulations. The composite particles obtainable by the process of the invention can also be used, in principle, in medical diagnostics and in other medical applications (cf., e.g., K. Mosbach and L. Andersson, Nature 270 (1977) 259 to 261; P. L. Kronick, Science 200 (1978) 1074 to 1076; and U.S. Pat. No. 4,157,323). Furthermore, the composite particles can also be used as catalysts in various aqueous dispersion systems.

It should also be noted that the aqueous dispersions of composite particles, obtainable in accordance with the invention, can be dried in a simple manner to give redispersible composite-particle powders (e.g., by freeze or spray drying). This is so in particular when the glass transition temperature of the polymer matrix of the composite particles obtainable in accordance with the invention is $\geq 50°$ C., preferably $\geq 60°$ C., with particular preference $\geq 70°$ C., with very particular preference $\geq 80°$ C., and, with special preference, $\geq 90°$ C. or $\geq 100°$ C. The composite-particle powders are suitable, inter alia, as plastics additives, components for toner formulations, and additives in electrophotographic applications.

EXAMPLES

Finely divided inorganic solids used for the examples below were silicon dioxide, tin(IV) oxide, yttrium(III) oxide and cerium(IV) oxide. Used as representative examples were the-commercially available silicon dioxide sols Levasil® 200 S (15 nm) from Bayer AG, Nyacol® 2040 (20 nm) and Nyacol® 830 (10 nm) from Akzo-Nobel and also Ludox® HS30 (12 nm) from DuPont. Also used were Nyacol® SN15 [tin(IV) oxide] (10 to 15 nm), Nyacol® YTTRIA [yttrium(III) oxide] (10 nm) and Nyacol® CEO2 {ACT} [cerium(IV) oxide] (10 to 20 nm). The values indicated in round brackets correspond to the diameters of the respective inorganic solid particles according to the manufacturers' indications.

Example 1

A 500 ml four-necked flask equipped with a reflux condenser, a thermometer, a mechanical stirrer and a metering device was charged under nitrogen atmosphere at 20° C. and 1 bar (absolute) with 90 g of deionized and oxygen-free water and with 0.08 g of CTAB and, with stirring (250 revolutions per minute), first 20 g of Nyacol® 2040 (having a silicon dioxide solids content of 40% by weight) and then 5 g of styrene were added and the mixture was subsequently heated to a reaction temperature of 75° C. The pH of this aqueous reaction medium, measured at 20° C. and 1 bar (absolute), was 8.6.

At reaction temperature, 0.1 g of ammonium peroxodisulfate dissolved in 10 g of deionized and oxygen-free water was added to the stirred reaction medium. The stirred reaction mixture was then held at reaction temperature for 3.5 hours and subsequently cooled to room temperature.

The resulting composite-particle dispersion had a solids content of 12.2% by weight, based on the overall weight of the aqueous composite-particle dispersion. Transmission electron microscopy analyses (cf., e.g., L. Reimer, Transmission Electron Microscopy, Springer-Verlag, Berlin, Heidelberg, 1989; D. C. Joy, The Basic Principles of EELS in Principles of Analytical Electron Microscopy, edited by D. C. Joy, A. D. Romig Jr. and J. I. Goldstein, Plenum Press, New York, 1986; L. C. Sawyer and D. T. Grupp, Polymer Microscopy, Chapman and Hall, London, 1987) showed raspberry-shaped composite particles having a diameter of approximately 100 nm. It was virtually impossible to detect any free silicon dioxide particles.

For the finely divided inorganic solids, in general, the sign of the electrophoretic mobility was determined by means of the Zetasizer 3000 from Malvern Instruments Ltd. For this purpose, the dispersion of finely divided inorganic solid was diluted with pH-neutral 10 mM potassium chloride solution (standard potassium chloride solution) until its concentration of solid particles was between 50 and 100 mg per liter. Dilute hydrochloric acid or dilute sodium hydroxide solution was used to establish the pH possessed by the aqueous reaction medium directly prior to the addition of the polymerization initiator.

Dilute hydrochloric acid was used to establish a pH of 8.6 in the Nyacol® 2040 dispersion diluted to a silicon dioxide solids content of 60 mg/l. The sign of the electrophoretic mobility of the silicon dioxide particles in Nyacol® 2040 was negative.

The solids content was determined in general by drying about 1 g of the composite-particle dispersion in an open aluminum crucible having an internal diameter of about 3 cm in a drying oven at 150° C. for 2 hours. To determine the solids content, two separate measurements were carried out in each case and the corresponding mean value was formed.

Example 2

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 2.5 using 1.62 g of 1 M hydrochloric acid and was made up to 100 g with water whose pH had been adjusted to 2.5 using 1 M hydrochloric acid. The reaction mixture was then heated to a reaction temperature of 75° C. The pH of this aqueous phase, measured at room temperature, was 2.5.

In parallel, an aqueous emulsion consisting of 20 g of styrene, 80 g of deionized and oxygen-free water, and 0.2 g of CTAB was prepared (feed stream 1). An initiator solution was prepared from 0.45 g of ammonium peroxodisulfate and 44.55 g of deionized and oxygen-free water (feed stream 2).

At reaction temperature, 5 g of feed stream 2 were added to the stirred reaction medium. After allowing 5 minutes to elapse, and 45 beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 10.4% by weight, based on the overall weight of the aqueous composite-particle dispersion. The presence of raspberry-shaped composite particles having a diameter of approximately 160 to 240 nm was demonstrated by means of transmission electron microscopy analyses. Free silicon dioxide particles were detected only in trace amounts.

The silicon dioxide particles had an electrophoretic mobility with a negative sign at a pH of 2.5.

Example 3

The procedure of Example 2 was repeated except that a pH of 5 was established in the aqueous reaction medium. The initial charge was prepared as follows: 60 g of deionized and oxygen-free water and 1.5 g of 1 M hydrochloric acid were introduced initially and 20 g of Nyacol® 2040 were added with stirring (250 revolutions per minute). The aqueous phase was subsequently adjusted to a pH of 5 using 1.01 g of 1 M hydrochloric acid and was made up to 100 g with water whose pH had been adjusted to 5 using 1 M hydrochloric acid.

The resulting composite-particle dispersion had a solids content of 11.6% by weight, based on the overall weight of the aqueous composite-particle dispersion. Transmission electron microscopy analyses demonstrate the presence of raspberry-shaped composite particles having a diameter of approximately 180 to 240 nm. It was virtually impossible to detect any free silicon dioxide particles.

At a pH of 5, the silicon dioxide particles had an electrophoretic mobility with a negative sign.

Example 4

The procedure of Example 2 was repeated except that a pH of 7 was established in the aqueous reaction medium and the polymerization initiator used, rather than 0.45 g of ammonium peroxodisulfate, was 0.45 g of sodium peroxodisulfate. In addition, the reaction temperature was increased from 75 to 85° C. The initial charge was prepared as follows: 60 g of deionized and oxygen-free water and 1.5 g of 1 M hydrochloric acid were introduced initially and 20 g of Nyacol® 2040 were added with stirring (250 revolutions per minute). The aqueous phase was subsequently adjusted to a pH of 7 using 0.5 g of 1 M hydrochloric acid and was made up to 100 g with water whose pH had been adjusted to 7 using 1 M hydrochloric acid.

The resulting composite-particle dispersion had a solids content of 11.2% by weight, based on the overall weight of the aqueous composite-particle dispersion. Transmission electron microscopy analyses demonstrated the presence of raspberry-shaped composite particles having a diameter of approximately 150 to 190 nm. It was virtually impossible to detect any free silicon dioxide particles.

At a pH of 7, the silicon dioxide particles had an electrophoretic mobility with a negative sign.

Example 5

Example 2 was repeated except that instead of 20 g of styrene a monomer mixture consisting of 10 g of styrene and 10 g of 2-ethylhexyl acrylate and instead of 0.2 g of CTAB 0.4 g of CTAB were used, and the polymerization initiator used, rather than 0.45 g of ammonium peroxodisulfate, was 0.45 g of sodium peroxodisulfate. In addition, the reaction temperature was increased from 75 to 85° C.

The resulting composite-particle dispersion had a solids content of 11.8% by weight, based on the overall weight of the aqueous composite-particle dispersion. Transmission electron microscopy analyses demonstrated the presence of raspberry-shaped composite particles having a-diameter of approximately 300 nm. It was virtually impossible to detect any free silicon dioxide particles.

Example 6

Example 2 was repeated except that instead of 20 g of styrene 20 g of methyl methacrylate (MMA) were used, and the polymerization initiator used, rather than 0.45 g of ammonium peroxodisulfate, was 0.45 g of sodium peroxodisulfate. In addition, the reaction temperature was increased from 75 to 85° C.

The resulting composite-particle dispersion had a solids content of 11.2% by weight, based on the overall weight of the aqueous composite-particle dispersion. Transmission electron microscopy measurements demonstrated the presence of raspberry-shaped composite particles having a diameter of approximately 80 to 140 nm. It was virtually impossible to detect any free silicon dioxide particles.

Example 7

Example 2 was repeated except that instead of 20 g of styrene a monomer mixture consisting of 10 g of MMA and 10 g of n-butyl acrylate was used.

The resulting composite-particle dispersion had a solids content of 11.6% by weight, based on the overall weight of the aqueous composite-particle dispersion. Transmission electron microscopy measurements demonstrated the presence of raspberry-shaped composite particles having a diameter of approximately 200 to 400 nm. It was virtually impossible to detect any free silicon dioxide particles.

Example 8

Under a nitrogen atmosphere, 40 g of deionized and oxygen-free water and 1.5 g of 1 M hydrochloric acid were charged at 20° C. and 1 bar (absolute) to a 500 ml four-necked flask and 40 g of Nyacol® 2040 were added with stirring (250 revolutions per minute). The aqueous phase was subsequently adjusted to a pH of 2.5 using 4 g of 1 M hydrochloric acid and was made up to 100 g with water whose pH had been adjusted to 2.5 using 1 M hydrochloric acid. The reaction mixture was then heated to a reaction temperature of 75° C.

In parallel, an aqueous emulsion consisting of 20 g of styrene, 20 g of n-butyl acrylate, 60 g of deionized and oxygen-free water, and 0.2 g of CTAB was prepared (feed stream 1). An initiator solution was prepared from 0.45 g of ammonium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 22.4% by weight, based on the overall weight of the aqueous composite-particle dispersion. The presence of raspberry-shaped composite particles having a diameter of approximately 240 nm was demonstrated by means of transmission electron microscopy analyses. It was virtually impossible to detect any free silicon dioxide particles.

Example 9

Under a nitrogen atmosphere, 15 g of deionized and oxygen-free water and 1.5 g of 1 M hydrochloric acid were charged at 20° C. and 1 bar (absolute) to a 500 ml four-necked flask and 73.5 g of Nyacol® 2040 were added with stirring (250 revolutions per minute). The aqueous phase was subsequently adjusted to a pH of 2.5 using 8.24 g of 1 M hydrochloric acid and was made up to 100 g with water whose pH had been adjusted to 2.5 using 1 M hydrochloric acid. The reaction mixture was then heated to a reaction temperature of 75° C.

In parallel, an aqueous emulsion consisting of 34.3 g of styrene, 34.3 g of n-butyl acrylate, 31.4 g of deionized and oxygen-free water, and 0.4 g of CTAB was prepared (feed stream 1). An initiator solution was prepared from 1.58 g of ammonium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 40.0% by weight, based on the overall weight of the aqueous composite-particle dispersion. The presence of raspberry-shaped composite particles having a diameter of approximately 270 nm was demonstrated by means of transmission electron microscopy measurements. It was virtually impossible to detect any free silicon dioxide particles.

Example 10

Under a nitrogen atmosphere, 50 g of deionized and oxygen-free water and 1.5 g of 1 M hydrochloric acid were charged at 20° C. and 1 bar (absolute) to a 500 ml four-necked flask and 26.7 g of Nyacol® 830 (having a silicon dioxide solids content of 30% by weight) were added with stirring (250 revolutions per minute).

The aqueous phase was subsequently adjusted to a pH of 2.5 using 4.06 g of 1 M hydrochloric acid and was made up to 100 g with water whose pH had been adjusted to 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 20 g of styrene, 80 g of deionized and oxygen-free water, and 0.2 g of CTAB was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.5% by weight, based on the overall weight of the aqueous composite-particle dispersion. The presence of raspberry-shaped composite particles having a diameter of approximately 160 nm was demonstrated by means of transmission electron microscopy measurements. It was virtually impossible to detect any free silicon dioxide particles.

At a pH of 2.5, the silicon dioxide particles of Nyacol® 830 had an electrophoretic mobility with a negative sign.

Example 11

Under a nitrogen atmosphere, 50 g of deionized and oxygen-free water and 1.5 g of 1 M hydrochloric acid were charged at 20° C. and 1 bar (absolute) to a 500 ml four-necked flask and 26.7 g of Ludox® HS30 (having a silicon dioxide solids content of 30% by weight) were added with stirring (250 revolutions per minute). The aqueous phase was subsequently adjusted to a pH of 2.5 using 1.88 g of 1 M hydrochloric acid and was made up to 100 g with water whose pH had been adjusted to 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 10 g of styrene, 10 g of n-butyl acrylate, 80 g of deionized and oxygen-free water, and 0.2 g of CTAB was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.2% by weight, based on the overall weight of the aqueous composite-particle dispersion. The presence of raspberry-shaped composite particles having a diameter of approximately 260 nm is demonstrated by means of transmission electron microscopy measurements. It was virtually impossible to detect any free silicon dioxide particles.

At a pH of 2.5, the silicon dioxide particles of Ludox® HS30 had an electrophoretic mobility with a negative sign.

Example 12

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 2.5 using 1.62 g of 1 M hydrochloric acid and was made up to 100 g with water whose pH had been adjusted to 2.5 using 1 M hydrochloric acid. The reaction mixture was then heated to a reaction temperature of 85° C.

In parallel, an aqueous emulsion consisting of 20 g of styrene, 78 g of deionized and oxygen-free water, and 2 g of a 20% strength by weight aqueous solution of the nonionic emulsifier Lutensol® AT18 (trademark of BASF AG, $C_{16}Cl_8$ fatty alcohol ethoxylate with 18 ethylene oxide units) was prepared (feed stream 1). An initiator solution was prepared from 0.45 g of AIBA and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.3% by weight, based on the overall weight of the aqueous composite-particle dispersion. The presence of raspberry-shaped composite particles having a diameter of approximately 200 nm was demonstrated by means of transmission electron microscopy measurements. It was virtually impossible to detect any free silicon dioxide particles.

Example 13

Under a nitrogen atmosphere, 46.7 g of deionized and oxygen-free water and about 0.02 g of 1 M sodium hydroxide solution were charged at 20° C. and 1 bar (absolute) to a 500 ml four-necked flask and 53.3 g of Nyacol® SN15 (having a tin dioxide solids content of 15% by weight) were added with stirring (250 revolutions per minute). The reaction mixture was then heated to a reaction temperature of 85° C. The pH of this aqueous phase, measured at room temperature, was 10.

In parallel, an aqueous emulsion consisting of 20 g of styrene, 1.5 g of 1 M hydrochloric acid, 78.5 g of deionized and oxygen-free water, and 0.2 [lacuna] of CTAB was prepared (feed stream 1). An initiator solution was prepared from 0.45 g of AIBA and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 10.4% by weight, based on the overall weight of the aqueous composite-particle dispersion. The presence of raspberry-shaped composite particles having a diameter of approximately 50 to 230 nm was demonstrated by means of transmission electron microscopy measurements. It was virtually impossible to detect any free tin dioxide particles.

At a pH of 10, the tin dioxide particles of Nyacol® SN15 had an electrophoretic mobility with a negative sign.

Example 14

Example 13 was repeated except that instead of 0.2 g of CTAB 0.4 g of CTAB and instead of 0.45 g of AIBA 0.45 g of sodium peroxodisulfate were used.

The resulting composite-particle dispersion had a solids content of 11.5% by weight, based on the overall weight of the aqueous composite-particle dispersion. Transmission electron microscopy measurements demonstrate the presence of raspberry-shaped composite particles having a diameter of approximately 130 nm. It was virtually impossible to detect any free tin dioxide particles.

Example 15

Under a nitrogen atmosphere, 73.3 g of deionized and oxygen-free water and 0.01 g of 1 M hydrochloric acid were charged at 20° C. and 1 bar (absolute) to a 500 ml four-necked flask and 26.7 g of Levasil® 200 S (having a silicon dioxide solids content of 30% by weight) were added with stirring (250 revolutions per minute). The reaction mixture was then heated to a reaction temperature of 85° C. The pH of this aqueous phase, measured at room temperature, was 3.8.

In parallel, an aqueous emulsion was prepared consisting of 20 g of styrene, 80 g of deionized and oxygen-free water, and 2,0 g of a 20% strength by weight aqueous solution of the nonionic emulsifier Lutensol® AT18 (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.0% by weight, based on the overall weight of the aqueous composite-particle dispersion. Transmission electron microscopy measurements demonstrate the presence of raspberry-shaped composite particles having a diameter of approximately 300 to 600 nm. It was virtually impossible to detect any free silicon dioxide particles.

At a pH of 3.8, the silicon dioxide particles of Levasil® 200 S had an electrophoretic mobility with a positive sign.

Example 16

Under a nitrogen atmosphere, 60 g of deionized and oxygen-free water and 0.01 g of 1 M hydrochloric acid were charged at 20° C. and 1 bar (absolute) to a 500 ml four-necked flask and 40 g of Nyacol® CEO2 {ACT} (having a cerium dioxide solids content of 20% by weight) were added with stirring (250 revolutions per minute). The reaction mixture was then heated to a reaction temperature of 85° C. The pH of this aqueous phase, measured at room temperature, was 3.

In parallel, an aqueous emulsion consisting of 20 g of styrene, 80 g of deionized and oxygen-free water, and 0.44 g of a 45% strength by weight aqueous solution of the anionic Dowfax® 2A1 was prepared (feed stream 1). An initiator solution was prepared from 0.45 g of AIBA and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.4% by weight, based on the overall weight of the aqueous composite-particle dispersion. The presence of raspberry-shaped composite particles having a diameter of approximately 130 nm was demonstrated by means of transmission electron microscopy measurements. It was virtually impossible to detect any free cerium dioxide particles.

At a pH of 3.0, the cerium dioxide particles of Nyacol® CEO2 {ACT} had an electrophoretic mobility with a positive sign.

Example 17

Under a nitrogen atmosphere, 42.9 g of deionized and oxygen-free water were charged at 20° C. and 1 bar (absolute) to a 500 ml four-necked flask and 57.1 g of Nyacol® YTTRIA (having a yttrium(III) oxide solids content of 14% by weight) were added with stirring (250 revolutions per minute). The reaction mixture was then heated to a reaction temperature of 85° C. The pH of this aqueous phase, measured at room temperature, was 7.2.

In parallel, an aqueous emulsion consisting of 20 g of styrene, 80 g of deionized and oxygen-free water, and 0.44 g of a 45% strength by weight aqueous solution of the anionic Dowfax® 2A1 was prepared (feed stream 1). An initiator solution was prepared from 0.45 g of AIBA and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 13.8% by weight, based on the overall weight of the aqueous composite-particle dispersion. The presence of raspberry-shaped composite particles having a diameter of approximately 60 nm was demonstrated by means of transmission electron microscopy measurements. It was virtually impossible to detect any free yttrium(III) oxide particles.

At a pH of 7.2, the yttrium(III) oxide particles of Nyacol® YTTRIA had an electrophoretic mobility with a positive sign.

Example 18

Example 2 was repeated except that instead of 20 g of styrene a monomer mixture consisting of 10 g of styrene and 10 g of n-butyl acrylate was used.

The resulting composite-particle dispersion had a solids content of 11.3% by weight, based on the overall weight of the aqueous composite-particle dispersion. Transmission electron microscopy analyses demonstrated the presence of raspberry-shaped composite particles having a diameter of approximately 180 to 300 nm. It was virtually impossible to detect any free silicon dioxide particles.

Centrifuging the composite-particle dispersion (3,000 revolutions per minute for 20 minutes) resulted in complete sedimentation of the composite particles. The supernatant aqueous reaction medium was water-clear. Virtually no free silicon dioxide particles were detectable in this water-clear reaction medium even by means of transmission electron microscopy analyses. Evaporative concentration of the water-clear solution at 150° C. to a constant weight gave a dry residue of 0.28% by weight, based on the overall weight of the water-clear solution. (Were the total amount of silicon dioxide particles to be present free in the serum, a dry residue of 3.3% by weight would have been expected. Accordingly, at least 92% by weight of the silicon dioxide particles are bound in composite particles. The actual fraction of bound silicon dioxide particles, however, is above this figure, since no regard has been taken of the fact that, in the serum, in addition to the free silicon dioxide particles, there are also salt from the neutralization of the silicon dioxide particles, emulsifier, and initiator decomposition products, the amounts of which cannot be calculated precisely.)

An analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Machtle, pages 147 to 175) was used to determine for the composite particles an average density of 1.22 g/cm³. In comparison, the density of the pure styrene-n-butyl acrylate copolymer (styrene and n-butyl acrylate in a weight ratio of 1 to 1) is only 1.055 g/cm³ (E. Penzel, Polyacrylates, in Ullmann's Encyclopedia of Industrial Chemistry, Vol. A 21, page 169).

Comparative Example 1

Example 18 was repeated except that instead of 0.2 g of the cationic emulsifier CTAB 0.44 g of a 45% strength by weight solution of the anionic emulsifier Dowfax® 2A1 was used.

The resulting cloudy reaction mixture was analyzed by means of transmission electron microscopy measurements. Only pure polymer particles and the dispersed silicon dioxide particles could be found. Raspberry-shaped composite particles were not detectable. Centrifuging of the cloudy dispersion (3,000 revolutions per minute for 20 minutes) did not lead to sedimentation of the dispersed particles.

Comparative Example 2

Example 15 was repeated except that instead of 0.45 g of sodium peroxide sulfate 0.45 g of AIBA was used.

The resulting cloudy reaction mixture was analyzed by means of transmission electron microscopy measurements. Only pure polymer particles and the dispersed silicon dioxide particles could be found. Raspberry-shaped composite particles were not detectable.

Comparative Example 3

Comparative Example 1 was repeated except that instead of 20 g of Nyacol® 2040 an additional 20 g of deionized and oxygen-free water were charged to the reaction vessel.

A stable, milky white polymer dispersion was obtained which could not be sedimented under the abovementioned conditions (3,000 revolutions per minute for 20 minutes).

Comparative Example 4

2.0 g of Nyacol® 2040 were incorporated by stirring into 24.1 g of the stable polymer dispersion from Comparative Example 3 at room temperature over the course of 5 minutes, giving a stable aqueous dispersion.

Comparison of the Film Properties

Exemplary film properties of the polymer films obtainable from the aqueous composite-particle dispersion of Example 18 (dispersion A) and from the dispersions of Comparative Examples 3 (dispersion B) and 4 (dispersion C) were compared.

a) Minimum film-forming temperature (MFT) and glass transition temperature (Tg)

The MFT was determined in accordance with ISO 2115 and the Tg in accordance with DIN 53765. The values obtained are given in Table 1.

TABLE 1

MFT and Tg values of the polymer films from dispersions A to C

| Dispersion | MFT in °C. | Tg in °C. |
|---|---|---|
| A | 14–15 | 21 |
| B | 16–17 | 21 |
| C | 16–17 | 23 | b) Film hardness

Dispersions A to C were applied to glass plates in a 250 μm wet-film thickness and were dried at 23° C. and 50% relative atmospheric humidity for four days. The film hardness was determined by the method of König (DIN 53157). In accordance with that method, the film is harder the higher the attenuation period. The values given in Table 2 demonstrate that the film formed from the composite-particle dispersion A has the greatest hardness.

TABLE 2

Hardness of the polymer films from dispersions A to C

| Dispersion | König hardness Attenuation period in seconds |
|---|---|
| A | 77.2 |
| B | 34.5 |
| C | 59.2 | c) Water absorption

Polymer films from the dispersions A to C having a specific weight of 100 mg/cm² were prepared (4 days' drying at 23° C. and 50% relative atmospheric humidity). Film strips measuring 2 cm×5 cm were immersed in deionized water at room temperature. Following a defined period, the film strips were removed from the water, dried with a dry cotton cloth and immediately weighed. The water absorption is calculated in accordance with the following formula:

$$\text{water absorption} = \frac{\text{weight}_{wet} - \text{weight}_0 \times 100\%}{\text{weight}_0}$$

where weights is the weight of the dry film before immersion in water and weight$_{wet}$ is the weight of the film immersed in the water for a defined period and then dried with a dry cotton cloth. The water absorption of the polymer films from the dispersions A to C following defined periods is given in Table 3. It is clearly evident that the film formed from the composite-particle dispersion A exhibits the lowest water absorption.

TABLE 3

Water absorption of the polymer films formed from the dispersions A to C

| Dispersion | Water absorption in % by weight after | | |
|---|---|---|---|
| | 1 hour | 24 hours | 72 hours |
| A | 3.6 | 3.8 | 5.6 |
| B | 3.3 | 20.0 | 34.0 |
| C | 8.2 | 10.2 | 13.5 |

We claim:

1. A process for preparing an aqueous dispersion of particles composed of addition polymer and finely divided inorganic solid, in which process at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant, wherein a) a stable aqueous dispersion of said at least one inorganic solid is used, said dispersion having the characteristic features that at an initial solids concentration of ≧1% by weight, based on the aqueous dispersion of said at least one solid, it still contains in dispersed form one hour after its preparation more than 90% by weight of the originally dispersed solid and its dispersed solid particles have a weight-average diameter ≦100 nm, b) the dispersed particles of said at least one inorganic solid exhibit a nonzero electrophoretic mobility in an aqueous standard potassium chloride solution at a pH which corresponds to the pH of the aqueous reaction medium at the beginning of the emulsion polymerization, and c) the radical-generating component of said at least one free-radical polymerization initiator and/or the dispersive component of said at least one dispersant have at least one electrical charge whose sign is opposite to the sign of the electrophoretic mobility of the dispersed particles of said at least one solid as possessed by said particles in an aqueous standard potassium chloride solution at a pH which corresponds to the pH of the aqueous reaction medium at the beginning of the emulsion polymerization.

2. A process as claimed in claim 1, wherein said at least one inorganic solid comprises at least one element selected from the group consisting of magnesium, calcium, strontium, barium, boron, titanium, chromium, iron, cobalt, nickel, copper, zinc, tin, zirconium, cerium, yttrium, aluminum, silicon, phosphorus, antimony, and bismuth.

3. A process as claimed in claim 1, wherein said at least one inorganic solid is selected from the group consisting of silicon dioxide, aluminum oxide, hydroxyaluminum oxide, calcium carbonate, magnesium carbonate, calcium orthophosphate, magnesium orthophosphate, iron(II) oxide, iron(III) oxide, iron(II/III) oxide, tin dioxide, cerium dioxide, yttrium(III) oxide, titanium dioxide, hydroxyapatite, zinc oxide, and zinc sulfide.

4. A process as claimed in claim 1, wherein said at least one inorganic solid in water at 20° C. and 1 bar (absolute) has a solubility ≦1 g/1 water.

5. A process as claimed in claim 1, wherein said at least one dispersant is an anionic emulsifier.

6. A process as claimed in claim 1, wherein said at least one dispersant is a cationic emulsifier.

7. A process as claimed in claim 1, wherein said at least one dispersant is an anionic protective colloid.

8. A process as claimed in claim 1, wherein said at least one dispersant is a cationic protective colloid.

9. A process as claimed in claim 1, wherein said at least one free-radical polymerization initiator is selected from the group consisting of sodium peroxodisulfate, potassium peroxodisulfate, and ammonium peroxodisulfate.

10. A process as claimed in claim 1, wherein said at least one free-radical polymerization initiator is 2,2'-azobis (amidinopropyl) dihydrochloride.

* * * * *